(12) United States Patent
Becherer et al.

(10) Patent No.: US 11,572,033 B2
(45) Date of Patent: Feb. 7, 2023

(54) RIDER HOLDER AND VEHICLE HAVING AT LEAST ONE SUCH RIDER HOLDER FOR AN AMUSEMENT RIDE, METHOD FOR OPERATING A VEHICLE, AND AMUSEMENT RIDE HAVING AT LEAST ONE SUCH VEHICLE

(71) Applicant: Mack Rides GmbH & Co. KG, Waldkirch (DE)

(72) Inventors: Markus Becherer, Elzach (DE); Stephan Schrade, Teningen (DE)

(73) Assignee: MACK RIDES GMBH & CO. KG, Waldkirch (DE)

( * ) Notice: Subject to any disclaimer, the term of this patent is extended or adjusted under 35 U.S.C. 154(b) by 359 days.

(21) Appl. No.: 16/644,783

(22) PCT Filed: Aug. 14, 2018

(86) PCT No.: PCT/EP2018/072001
§ 371 (c)(1),
(2) Date: Mar. 5, 2020

(87) PCT Pub. No.: WO2019/048194
PCT Pub. Date: Mar. 14, 2019

(65) Prior Publication Data
US 2021/0078528 A1 Mar. 18, 2021

(30) Foreign Application Priority Data
Sep. 7, 2017 (DE) .......................... 102017120645.0

(51) Int. Cl.
*B60R 22/48* (2006.01)
*A63G 7/00* (2006.01)
*B60R 22/30* (2006.01)

(52) U.S. Cl.
CPC ................ *B60R 22/48* (2013.01); *A63G 7/00* (2013.01); *B60R 22/30* (2013.01); *B60R 2022/4816* (2013.01)

(58) Field of Classification Search
CPC . B60R 22/30; B60R 22/48; B60R 2022/4816; A63G 7/00
See application file for complete search history.

(56) References Cited

U.S. PATENT DOCUMENTS 5,015,933 A 5/1991 Watkins et al.
5,489,212 A 2/1996 Masao et al.
(Continued)

FOREIGN PATENT DOCUMENTS

CN 101282772 A 10/2008
DE 102007032171 A1 2/2009
(Continued)

OTHER PUBLICATIONS

Chinese Office Action, in parallel pending Chinese patent application No. 201880058485,6.
(Continued)

*Primary Examiner* — Karen Beck
*Assistant Examiner* — Scott F. Underwood
(74) *Attorney, Agent, or Firm* — Nath, Goldberg & Meyer; Jerald L. Meyer; Stanley N. Protigal

(57) ABSTRACT

The present invention relates to a rider holder for an amusement ride (14), comprising a holding portion (16) for holding a rider, a restraining device (24) which can be moved between an open position, in which the rider can access the holding portion (16), and a closed position, in which the held rider in the holding portion (16) can interact with the restraining device (24), a lockable securing device (32) which, in a locked state, fixes the restraining device (24) in the closed position and, in an unlocked state, releases the
(Continued)

restraining device (24), and a control unit (52) which has detection means (55), by means of which it can be redundantly determined in a fail-safe manner whether the securing device (32) is in the locked or unlocked state, wherein the control unit (52) generates corresponding state signals. The invention further relates to a vehicle having at least one such rider holder for an amusement ride and to a method for operating such a vehicle. Furthermore, the invention relates to an amusement ride having at least one such vehicle.

23 Claims, 3 Drawing Sheets

(56) References Cited

U.S. PATENT DOCUMENTS

| | | | |
|---|---|---|---|
| 5,915,286 A * | 6/1999 | Figi | B60R 22/48 |
| | | | 73/865.9 |
| 7,837,566 B2 | 11/2010 | Smith et al. | |
| 2002/0070599 A1 * | 6/2002 | Berra | A63G 7/00 |
| | | | 297/466 |
| 2009/0015394 A1 | 1/2009 | Specht et al. | |
| 2012/0068521 A1 | 3/2012 | Roodenburg et al. | |
| 2016/0136814 A1 * | 5/2016 | Garde | G05B 19/406 |
| | | | 700/264 |
| 2018/0312173 A1 * | 11/2018 | Hall | B61L 15/0072 |
| 2019/0184935 A1 * | 6/2019 | Blum | A63G 7/00 |
| 2021/0229613 A1 * | 7/2021 | Wilcox | B60R 21/00 |
| 2022/0105895 A1 * | 4/2022 | Simonelli | B60R 22/325 |

FOREIGN PATENT DOCUMENTS

| | | | |
|---|---|---|---|
| EP | 1245459 A1 | | 10/2002 |
| EP | 3003789 A1 | | 4/2016 |
| EP | 3574967 A1 | * | 12/2019 |
| JP | 2-82653 U | | 6/1990 |
| JP | 2015074350 A | | 4/2015 |
| JP | 2017523393 A | | 8/2017 |
| KR | 20170142609 A | * | 6/2016 |

OTHER PUBLICATIONS

Office Action dated Mar. 17, 2021, in corresponding JP application No. 2020-511957, with English translation.

Office Action dated May 16, 2018, in corresponding application DE102017120645.0.

* cited by examiner

RIDER HOLDER AND VEHICLE HAVING AT LEAST ONE SUCH RIDER HOLDER FOR AN AMUSEMENT RIDE, METHOD FOR OPERATING A VEHICLE, AND AMUSEMENT RIDE HAVING AT LEAST ONE SUCH VEHICLE

CROSS-REFERENCE TO PRIOR APPLICATION

This is a National Phase Application filed under 35 U.S.C. 371 as a national stage of PCT/EP2018/072001, filed Aug. 14, 2018, an application claiming the benefit of German Application No. 10 2017 120 645.0 filed Sep. 7, 2017, the content of each of which is hereby incorporated by reference in its entirety.

FIELD

The present invention relates to a rider holder for an amusement ride. The invention further relates to a vehicle having at least one such rider holder for an amusement ride and to a method for operating such a vehicle. Furthermore, the invention relates to an amusement ride having at least one such vehicle.

BACKGROUND

The attractiveness of the amusement rides plays a very important role in the feasibility of a profitable operation of the amusement rides. Therefore, the goal is to create the most possible surprising ride experiences for the rider. With regard to roller coasters, these amusement ride experiences are created, inter alia, with loops, with sharp curves, with track sections with steep slopes and with spiral track sections.

These amusement ride experiences can be brought about only if the riders can be restrained safely in the amusement ride. For this purpose, the amusement rides include a number of vehicles with rider holders into which the riders can seat themselves, stand or lie. In the rider holders, the riders are secured with the help of restraining devices which frequently include securing clips. For this purpose, the restraining devices and in particular the securing clips are moved from an open position, in which the rider can access the rider holder, into a closed position, in which the rider interacts with the restraining device so that he/she cannot fall out of the rider holder during the ride, even in case of high accelerations and stresses. The securing clip can be moved between the open position and the closed position with the help of an adjustment device. The adjustment device is usually operated by means of a hydraulic system. However, it is also conceivable to operate the adjustment device mechanically, electrically or pneumatically. But the securing clip can also be moved between the open position and the closed position by the rider himself/herself or by an employee of the amusement ride.

To prevent the rider from falling out of the rider holder during the ride, the restraining device must be fixed in the closed position. For this purpose, lockable securing devices can be used, which, in the locked state, fix the restraining device in the closed position and, in an unlocked state, release the restraining device. The securing devices can be formed very differently and fix the restraining device in the closed position, for example, mechanically, pneumatically or hydraulically, so that the term "lockable" does not assume the presence of a mechanical lock.

In many cases, either the rider or an employee of the amusement ride has to move the securing device into the locked state. In the process, operating errors can occur, so that the securing device cannot ensure that the restraining device is fixed in the closed position. As a result, the safety of the rider cannot be ensured, which must be avoided under all circumstances. In order to prevent a ride from starting in spite of an operating error of the securing device, control units are disclosed, for example, in U.S. Pat. No. 7,837,566 B2, which are able to detect whether the securing device has been locked correctly. Some control units are configured so that a ride cannot be started if the control units detect that at least one of the securing devices has not been locked. However, the control units are unable to describe their own state and identify disturbances. Therefore, it can occur that the control unit does not work correctly to the extent that it reports that the securing device is locked although this is not the case. This is problematic to the extent that the employees of the amusement ride may tend to rely on the message of the control unit and omit manual or visual verifications of the securing device.

In many cases, the securing devices are arranged within reach of the rider. In control units which are configured as described, the riders can prevent or delay a ride by intentionally not transferring the securing device into the locked state or by unlocking it again. In addition, the riders can, for example, introduce metal plates that they bring along into the securing device so that the control units detect the locking of the securing device although this is not the case. Consequently, a ride can be started although at least one of the securing devices has not been locked, which can lead to unforeseeable consequences.

SUMMARY

The aim of an embodiment of the present invention is to indicate a rider holder by means of which the safety of the operation of an amusement ride can be increased and rider-caused delays can be avoided. In particular, a rider holder is to be indicated, by means of which it can be detected whether the securing device is in fact in the locked state.

Moreover, the underlying aim of a design and an implementation of the present invention is to create a vehicle for an amusement ride and an amusement ride which can be operated with increased safety and fewer delays. In addition, the underlying aim of an embodiment of the invention is to provide a method for operating such a vehicle.

An embodiment of the invention relates to a rider holder for an amusement ride, comprising a holding portion for holding a rider, a restraining device which can be moved between an open position, in which the rider can access the holding portion, and a closed position, in which the held rider in the holding portion can interact with the restraining device, a lockable securing device which, in a locked state, fixes the restraining device in the closed position and, in an unlocked state, releases the restraining device, and a control unit which has detection means by means of which it can be redundantly determined in a fail-safe manner whether the securing device is in the locked or unlocked state, wherein the control unit generates corresponding state signals.

"In a fail-safe manner" is understood to mean the following: The state signals contain not only information on whether the securing device is in the locked state, but also information on whether the control unit is operating correctly. The detection means are redundantly designed so that the malfunction of a detection means does not lead to state signals that do not reproduce the actual state of the securing device. In addition, the control unit is designed so that the failure or the malfunction of one or of all the detection means is detected. The control unit is self-checking at least with regard to the detection means. For this purpose, the control unit can comprise, for example, a test circuit, in which the at least two detection means are connected in series. The test circuit performs a resistance measurement. If one or all of the detection means are working incorrectly, the resistance changes.

The information on whether the control unit is working correctly or not is also contained in the state signals. To that extent, the operation of the amusement ride can already be interrupted if only the detection means are not working correctly. This prevents the operation of the amusement ride when the state of the securing device cannot be detected unequivocally. The operational safety of the amusement ride is increased as a result.

According to a measure of an additional embodiment, the control unit comprises tampering detection means, by means of which it is possible to detect in a tamper-proof manner whether the securing device is in the locked or unlocked state, wherein the control unit generates corresponding state signals.

The operation of the amusement ride is safer in particular in that the control unit and/or the securing device is/are designed to be tamper-proof. The tamper-proof design can be implemented, for example, in that only authorized persons, in particular the employees of the amusement ride, can transfer the securing device into the locked state. For this purpose, the tampering detection means can include proximity sensors which are carried by the employees of the amusement ride, so that the securing device can only be transferred into the locked state when the employee is in the immediate vicinity of the securing device.

In addition, the securing device can be configured so that the locked state, once it has been assumed, can be held immediately and changed again only after the end of the ride. In particular in older amusement rides, it is possible to set the securing device back into the unlocked state during the ride. Even in more modern amusement rides, the locked state is maintained only shortly before the beginning until the end of the ride, so that, until that time, the rider who has boarded has the possibility of setting the securing device back into the unlocked state and delaying the operating procedure.

Due to the possibility of being able to detect in a tamper-proof manner whether the securing device is in the locked or unlocked state, the operating procedure is safer and on schedule. Because the control unit generates state signals, it can be detected immediately whether the securing device is in the locked or unlocked state. The employees of the amusement ride can intervene immediately, and the resulting delays in the operating procedure can be kept low.

According to another embodiment, the securing device comprises a holding element fastened on the rider holder or on the restraining device and a counter element which can be moved relative to the holding element, wherein, in the locked state of the securing device, the counter element is fixedly held by the holding element, and the tampering detection means include at least identification means arranged on the counter element, which can be read by the control unit. The holding element is fastened firmly on the rider holder or on the restraining device, whereas the counter element is able to perform a relative movement with respect to the holding element. For example, the holding element can be designed as a protrusion, and the counter element can be designed in the manner of a striker plate or vice versa, so that a positive-locking connection is generated in the locked state. Alternatively, magnetic forces can be generated, by means of which the counter element is held by the holding element.

By means of the identification means, it can be detected unequivocally that only the provided counter element is interacting with the holding element. The identification means can be designed, for example, as bar codes applied to the counter element, transponders or RFID chips. It is possible to apply the identification means to the counter element in such a manner that they are not visible to the human eye. As a result, intentional destruction of the identification means can be prevented. Tampering is thus prevented.

In a further developed embodiment, the securing device can comprise an actuatable safety switch which interacts with the holding element for fixing and releasing the restraining device. The use of a safety switch has, in particular, the advantage that it can be incorporated in a control circuit and thus be remote controlled. In addition, the safety switch can be provided with an identification, so that the state signals can be associated unequivocally with a certain control unit. The employees of the amusement ride thus receive information on which securing devices are in the locked state and which are not. For the case in which the employees have to intervene, they know which rider holder is concerned, so that a long search is dispensed with.

In a further developed embodiment, the holding element can be formed by the safety switch. Thereby, a compact assembly is formed, which is easy to install. Furthermore, the number of the component parts is decreased, whereby the likelihood of an error is reduced.

A further developed embodiment is characterized in that the control unit and in particular the safety switch are configured in such a manner that, on the PLe level or on the SIL3 level, it can be detected whether the securing device is in the locked state. PL is understood to mean a so-called performance level which is defined according to the standard EN 13849. The performance level is a measure of the reliability of a safety function, wherein level a represents the lowest level and level e represents the highest level. SIL stands for safety integrity level and also describes the reliability of safety functions. The PLe level and the SIL3 level guarantee a high contribution to risk reduction. The safety with which the amusement ride can be operated is correspondingly high.

According to an additional embodiment, the control unit and the stationary components of the securing device are combined to form a physical unit. In principle, the functions of the securing device and of the control unit can be distributed over different subunits which can be arranged spatially separate from one another. To that extent, the terms "securing device" and "control unit" should not be understood to mean that they have to be units that are structurally connected. For example, the detection means, which can work optically or inductively, for example, can be arranged spatially separate from an analysis element which analyzes the signals of the detection means and generates the state signal. The transmission of the state signal to the employees of the amusement ride in turn can be assumed by another unit.

However, it is possible in particular to combine the control unit and the stationary components of the securing device in the safety switch. Stationary components should be understood to mean components which are installed fixed in place in the rider holder or which move on a predetermined track between precisely definable positions within the rider holder. For example, the counter element does not form a stationary component, since it has to be mobile relative to the holding element without its track being predetermined. The holding element is mobile on a predetermined path between two precisely definable positions within the rider holder and therefore forms a stationary component in spite of its mobility.

The combining of the stationary components of the securing device and of the control unit to form a physical unit has advantages particularly during the installation, since the connection by cable of the control unit and of the different components of the securing device is dispensed with or at least considerably simplified. In addition, the logistics and storage are simplified, since only one physical unit has to be stocked and not a larger number of individual components.

Although it is possible to combine all the stationary components of the securing device and the control unit and thus their functions to form a physical unit, it can be advantageous in the individual case to have one or more functions be performed by one or more elements arranged outside of the physical unit. The type and the number of functions performed by elements arranged outside of the physical unit are here freely selectable.

In an additional embodiment, the counter element can interact with the holding element in a self-opening manner. Interacting in a self-opening manner here is understood to mean that, when the securing device is put into the unlocked state, the counter element is not only released but also moved away from the holding element in the process. This can be achieved, for example, in that, when the counter element is moved with respect to the holding element, a spring which interacts with the counter element is pretensioned and which, in the locked state, is kept pretensioned by the holding element, and, in the released state, is released. During the release, the spring moves the counter element away from the holding element. Thereby, the rider receives clear feedback indicating that the securing device has been unlocked. The rider himself/herself does not have to do anything in this regard. In addition, the rider is prevented from waiting for the unlocking to occur when it has already occurred unbeknownst to him/her. The rider is thereby encouraged to exit the rider holder immediately after the unlocking has occurred. As a result, the throughput ridership of the amusement ride is increased.

According to another embodiment, the counter element is formed as a belt latch which is fastened to a belt connected to the restraining device or the rider holder. Belt systems with belt latches and belts as tensile force transmission means are cost effective to procure, reliable during operation, and easy to operate and exchange.

An additional embodiment is characterized in that the belt comprises a belt length adjustment device. A belt length adjustment device makes it possible for the rider and/or the employee to adapt the effective belt length to his/her body measurements, so that he/she is held, on the one hand, comfortably, and, on the other hand, safely in the rider holder.

An additional embodiment is characterized in that the belt, at its free end, forms a handle section, in particular a belt loop. The handle section, in particular the belt loop, facilitates the grasping of the belt and in particular the adjustment of the belt length. As an alternative to the belt loop, an easily grasped object such as a ball can be incorporated in the belt in order to create the handle section.

In an additional embodiment, the belt can be connected at its fixed end to a load relieving element. Thus, it is possible to design the locking unit so that it absorbs most of the forces acting on the restraining device during operation. The load relieving element ensures that the belt is operated during operation only under a clearly reduced load, whereby the wear of the belt is prevented. Accordingly, it needs to be replaced less frequently. The load relieving element itself can be fastened either on the rider holder or on a suitable site of the vehicle.

In an additional embodiment, the rider holder comprises a locking unit with which the restraining device can be locked at least in the closed position. In this case, the restraining device is held in the closed position by two separate systems, so that a redundancy is created for the case in which the locking unit fails. In this case, the restraining device is held in the closed position by the securing device.

In a further developed embodiment, the rider holder includes a testing unit, by means of which the functional capability of the locking unit can be detected, wherein the testing unit generates corresponding functional capability signals. For example, the locking unit can be operated hydraulically or pneumatically. By means of the testing unit, it can be determined whether the locking unit is working correctly. Should this not be the case, the testing unit generates corresponding functional capability signals, so that in particular the employees of the amusement ride can take appropriate countermeasures. It should be pointed out here that the functional capability of the locking unit can also be checked without the testing unit, for example, by manual and/or visual inspection of the restraining device, which is performed by the employees of the amusement ride.

A design of the invention relates to a vehicle for an amusement ride, which comprises at least one rider holder according to any one of the preceding embodiments.

The technical effects and advantages which can be achieved with the proposed vehicle correspond to those that were explained for the present rider holder. In summary, it should be pointed out that the vehicle can be operated with increased safety and fewer rider-caused delays, since tampering with the securing device on the part of the riders is made more difficult or impossible.

In an additional design, the vehicle can comprise at least two of the rider holders and a communication system communicating with the control unit, by means of which the state signals can be associated unequivocally with the control unit of the rider holder in question. The control unit is provided with an identification which can be read by the communication system and which enables an association of the control unit with the rider holder controlled by it. Thereby, the employees of the amusement ride receive information on which securing devices are in the locked state and which are not. For the case in which an intervention of the employees may be necessary, a long search is dispensed with. Delays in the operating procedure are kept low thereby.

In an additional design, the communication system communicates with the testing unit in such a manner that the functional capability signals of the testing unit can be associated with the rider holder in question. As mentioned, by means of the testing unit, it can be determined whether the locking unit is working correctly. Should this not be the case, the testing unit generates corresponding functional capability signals, so that in particular the employees of the amusement ride can take corresponding countermeasures. The testing unit as well is provided with an identification which can be read by the communication system and which enables an association of the testing unit with the rider holder checked by it. For the case in which an intervention of the employee may be necessary, a long search is dispensed with. Delays in the operating procedure are kept low thereby.

A design of the invention relates to a method for operating a vehicle according to one of the preceding designs, comprising the following steps:
  moving of the restraining device into the closed position,
  fixing of the restraining device in the closed position by means of the securing device which has been moved into the locked state, and
  redundant and fail-safe detection of whether the securing device is in the locked state by means of the detection means and generating of a corresponding state signal by means of the control unit.

The technical effects and advantages which can be achieved with the proposed method correspond to those that were explained for the present rider holder. A point to be emphasized is that with the proposed method it is possible to get information on the functional capability of the detection means, and, already in the case of a failure of one of the redundantly designed detection means, to obtain a corresponding message based on the state signals, so that countermeasures can be taken immediately or promptly.

According to a further developed design, the method comprises the following steps:
  tamper-proof detection of whether the securing device is in the locked state, and generating of a corresponding signal by means of the tampering detection means.

The vehicle in question can be operated with increased safety and with fewer rider-caused delays, since tampering with the securing device on the part of the riders is made more difficult or impossible.

In an additional design, the method comprises the following steps:
  checking of the functional capability of the locking unit and generating of corresponding functional capability signals by means of the testing unit.

In this design, it can be detected whether the locking unit is working correctly. Based on the functional capability signals, the employees of the amusement ride have current information on the state of the locking unit.

When a locking unit is not working correctly, countermeasures can be taken immediately, whereby the operational safety is increased.

In an additional design, the method comprises the following steps:
  associating of the functional capability signals of the rider holder in question by means of the communication system, and
  for the case in which the functional capability of the locking unit of the rider holder in question is not present, blocking of the rider holder in question by fixing the restraining device in the closed position.

Via the communication system, it is possible to immediately identify the rider holder, the locking unit of which is not working correctly. In this case, the rider holder in question is blocked so that it can no longer be used by a rider. This can occur in that the restraining device is brought by means of a rope into a position, in which the access to the holding portion of the rider holder is blocked. Thereby, it is prevented that the rider holder in question is used in spite of the incorrectly operating locking unit. Nevertheless, the remaining rider holders, the locking units of which are working correctly, can continue to be used.

In known amusement rides, all the securing clips of a row of rider holders of a vehicle are actuated by the same hydraulic circuit. Usually, at least four rider holders are arranged in a row. When the locking unit for a rider holder is not working correctly, the entire row of the rider holders has to be shut down, whereby the capacity of the amusement ride is considerably reduced.

As proposed, only the rider holders who are actually concerned are shut down. The rider holder which is not working correctly can be repaired or exchanged after closure of the operation. The capacity of the amusement ride is thereby limited only to the absolutely necessary extent.

A further developed design of the invention comprises the following steps:
  fixing of the restraining device in the closed position by locking the securing device.

Since the securing device is present in any case, it can be used for the case in which the locking unit is not working correctly, in order to fix the restraining device in the closed position and in order to prevent the rider from being allowed to access the rider holder in question. Additional means for fixing the restraining device in the closed position are not necessary. In addition, a control can be performed thereby to determine whether the rider holder which comprises a faulty locking unit has in fact been blocked. The communication system thus provides information on the functional capability of the locking unit and also on the state of the securing device. In case a locking unit is not working correctly, a ride can be started only if the securing device of the same rider holder is in the locked state. The locked state can then no longer be suspended until the closure of the operation.

A further developed design of the invention comprises the following steps:
  unlocking of the securing device and in particular of the safety switch,
  stepwise moving of the restraining device and in particular of the securing clip from the closed position, to the point that the counter element is no longer in contact with the holding element, and
  when the counter element is no longer in contact with the holding element, moving of the restraining device and in particular of the securing clip into the open position.

As mentioned, the counter element can interact with the holding element in a self-opening manner, for the purpose of which, for example, a spring is pretensioned when the counter element is introduced into the securing device. During the loosening, the load on the spring is relieved, and the counter element moves away from the holding element. However, in this solution, the counter element may jump uncontrollably out of the securing device and hit the lining components of the vehicle or the riders or employees of the amusement ride. In order to prevent this, in this design of the method, first the securing device is unlocked and subsequently the counter element is pulled out stepwise out of the securing device by means of the securing clip, to the point that the counter element is no longer in contact with the holding element. For this purpose, the securing clip is moved from the closed position in the direction of the open position. In the process, the counter element is moved only slowly and in a controlled manner. If the counter element is far enough from the holding element, the securing clip can be moved into the open position. The information that the counter element is far enough from the holding element can be generated via the setting of the securing clip or via the tampering detection means. For example, when the safety switch can no longer detect the RFID chip, this can be evaluated as information indicating that the securing clip can be moved in the open position.

If necessary, the securing clip can still be held for a certain time, if the counter element has not been completely pulled out of the securing device, for example, to let pendulum movements of the counter element abate, and not to further amplify said pendulum movements by moving the securing clip into the open position.

An implementation of the invention relates to an amusement ride with a vehicle according to one of the above-described designs, wherein the vehicle can be operated with a method according to one of the embodiments explained above.

The technical effects and advantages which can be achieved with the proposed amusement ride correspond to those that have been explained for the present rider holder, the proposed amusement ride and the present method. In summary, it should be pointed out that the vehicle can be operated with increased safety and with fewer rider-caused delays, since tampering with the securing device on the part of the riders is made more difficult or impossible.

BRIEF DESCRIPTION OF THE DRAWINGS

Exemplary embodiments of the invention are explained in greater detail below in reference to the appended drawings. In the drawings.

DETAILED DESCRIPTION

Figure 1:
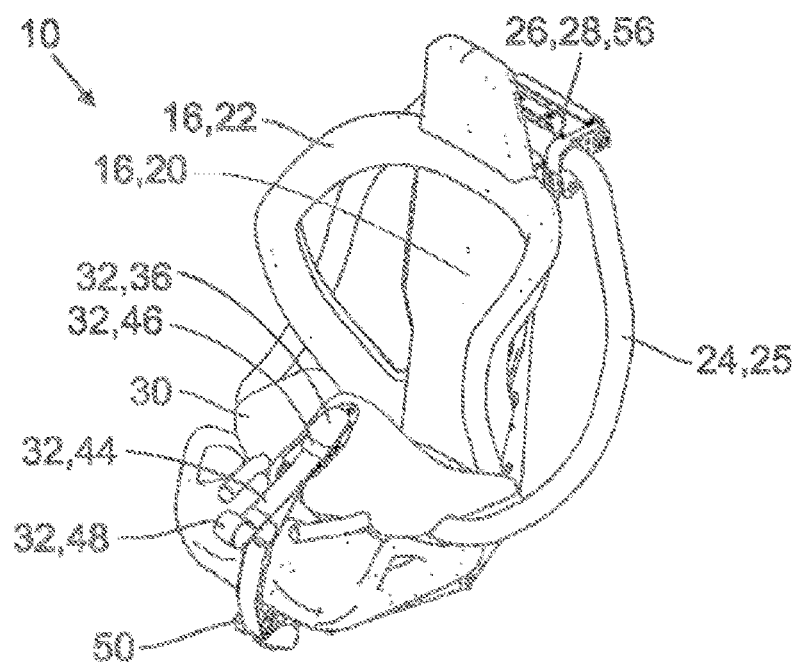
FIG. 1 shows an embodiment example of a rider holder according to the invention using a perspective representation.
Figure 2:
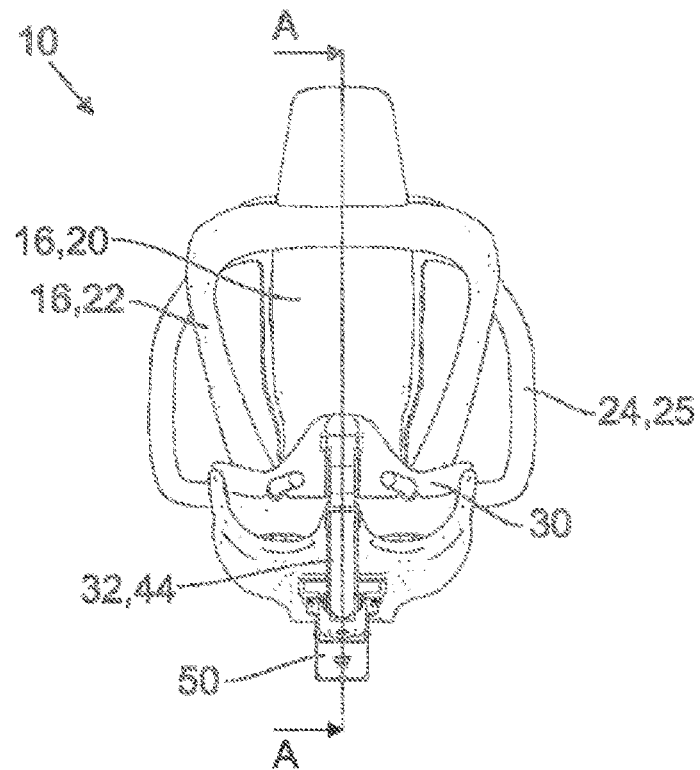
FIG. 2 shows the rider holder represented in FIG. 1 using a front view.
Figure 3:
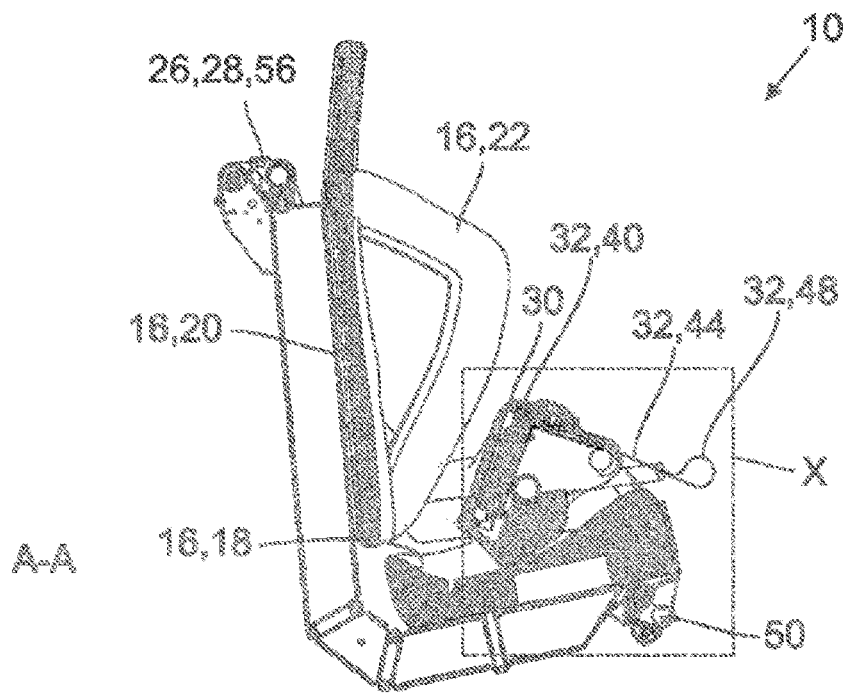
FIG. 3 shows a cross-sectional representation of the rider holder along the section plane A-A defined in FIG. 2.
Figure 6:
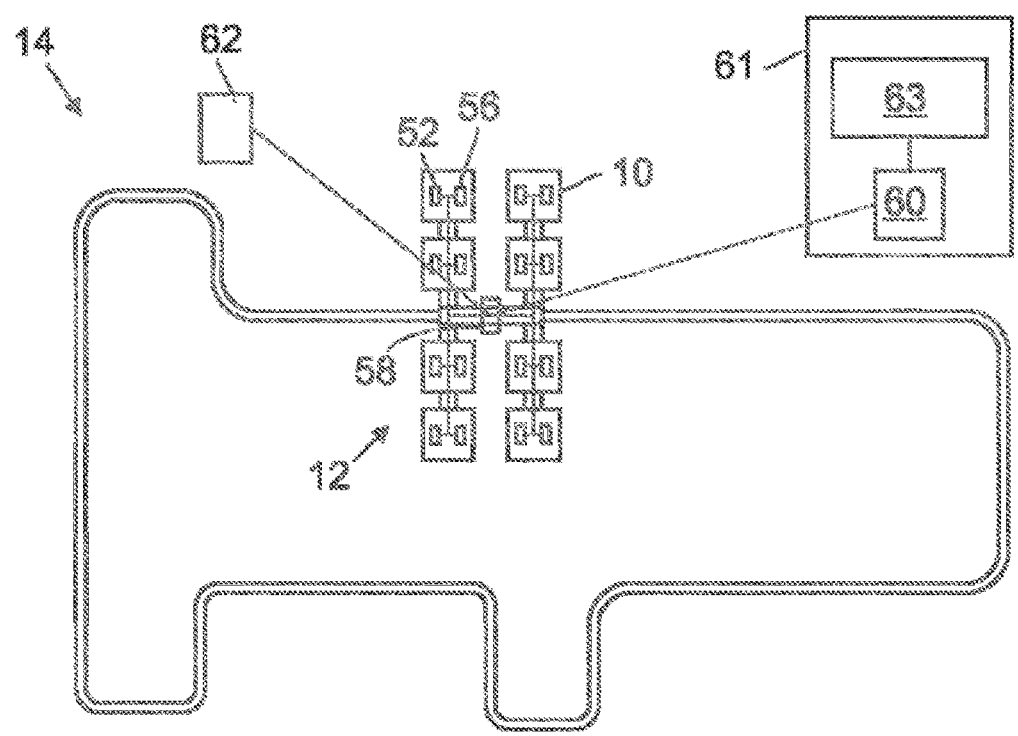
FIG. 6 shows a general top view onto an amusement ride which has a number of the rider holders according to the invention.

In FIGS. 1 to 3 an embodiment example of the rider holder 10 according to the invention is shown using different views. The rider holder 10 is arranged on a vehicle 12 which is represented in FIG. 6 and which is part of an amusement ride 14.

The rider holder 10 comprises a holding portion 16 which, in the represented embodiment example, is designed as a rider seat which has a seat surface 18 (see FIG. 3), a back rest 20, and two armrests 22. In addition, the rider holder 10 comprises a restraining device 24 which comprises a securing clip 25 which is rotatably mounted on the rider holder 10 and which can be adjusted by means of an adjustment device 26 between an open position, not represented, and a closed position shown in FIGS. 1 to 3. In the represented embodiment example, the adjustment device 26 is configured so that it can detect the security bracket 25 in the open position and in the closed position. To that extent, the adjustment device 26 is also used as a locking unit 28. For this purpose, the adjustment device 26 or the locking unit 28 is connected, for example, to a hydraulic system, not represented.

In the open position, the holding portion 16 is accessible to the rider so that he/she can sit down in the holding portion 16 or climb out of it again.

The securing clip 25 comprises a thigh pad 30 which, in the closed position, is in contact with the thigh of the rider, not represented, sitting in the holding portion 16.

Figures 4, 5:
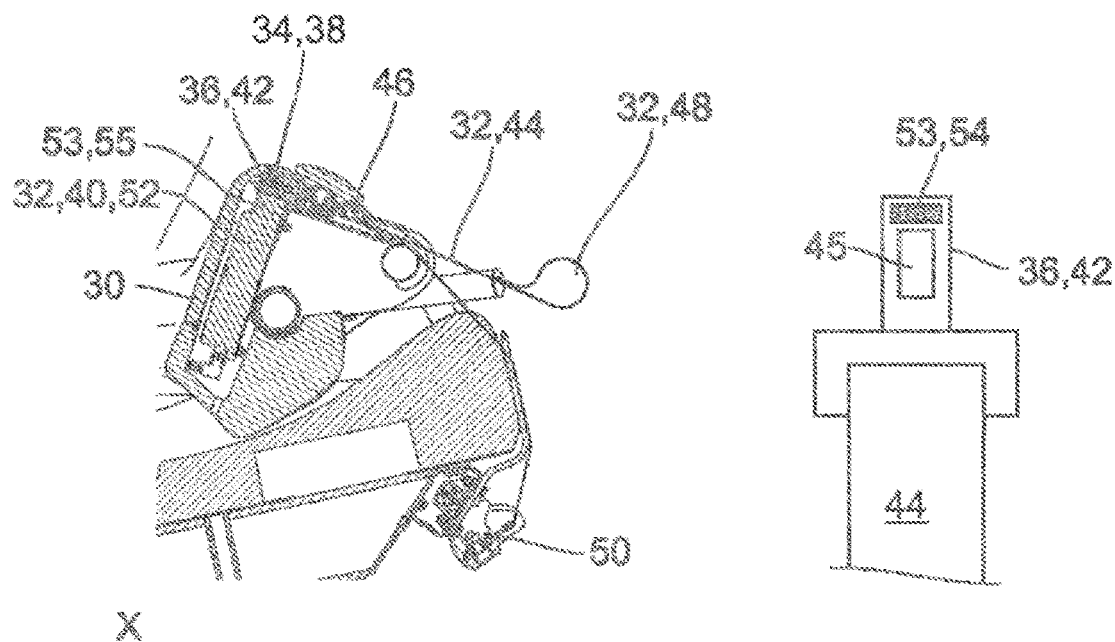
FIG. 4 shows an enlarged representation of the area X marked in FIG. 3.
FIG. 5 shows a general top view of a counter element according to the invention.

In addition, the rider holder 10 according to the invention includes a securing device 32 which can be seen well particularly in FIGS. 3 and 4. In the represented embodiment example, the securing device 32 is a holding element 34 and a counter element 36, wherein the holding element 34 is formed as a protrusion 38 which is arranged on a safety switch 40. The counter element 36 is designed as a belt latch 42 which is connected to a belt 44 and which forms an opening 45 (see FIG. 5). In addition, a belt length adjustment device 46 is provided, which fixes the belt 44 to a selectable length. Moreover, the belt 44, on its free end, forms a handle section 48 which is implemented here as a belt loop. On its end facing the free end, the belt 44 is fastened by means of a load relieving element 50 on the rider holder 10.

The safety switch 40 is arranged in the thigh pad 30 of the securing clip 25. With the help of the safety switch 40, the holding element 34 can be moved axially. The holding element 34 can engage in a positive-locking manner in a first end position in the opening 45 of the belt latch 42, while, in a second end position of the holding element 34, no positive-locking engagement is possible.

In the safety switch 40, a control unit 52 is integrated, which comprises detection means 55, by means of which, in a redundant and fail-safe manner information, can be obtained on whether the securing device 32 is in the locked state. Moreover, the control unit 52 comprises tampering detection means 53, with which it can be determined in a tamper-proof manner whether the securing device 32 is in the locked state or not. The tampering detection means 53 comprise identification means 54, arranged on the counter element 36, which can be designed, for example, as an RFID chip. The control unit 52 of the safety switch 40 can here read the identification means 54 and consequently detect whether the correct counter element 36 has been introduced into the securing device 32. In addition, the safety switch 40 can detect whether the holding element 34 engages in fact in a positive-locking manner in the counter element 36. The securing device 32 is located only in the locked state if the holding element 34 engages in the counter element 36 which has been identified as correct. The safety switch 40 forms a physical unit, in which the control unit 52 and the stationary components of the securing device 32 are combined.

Moreover, the rider holder 10 comprises a testing unit 56, with which it can be checked whether the locking unit 28 is working correctly or not. According to the invention, the amusement ride 14 can also be operated without the testing unit 56. In this case, the functional capability of the locking unit 28 is checked by the employee of the amusement ride 14 in particular by visual inspection.

The amusement ride 14 is provided with a communication system 58 which is shown in FIG. 6. The communication system 58 is in connection with a control unit 60 of the amusement ride 14 as well as with the control unit 52 and with the testing unit 56. The control unit 60 is usually arranged in a building 61, in which an employee responsible for the operation of the amusement ride 14 is working. In the building 61, a display 63 is arranged, which is connected to the control unit 60 and which displays all the relevant information with regard to the state of the amusement ride 12. In addition, a number of mobile terminals 62 such as wearables, tablets and/or the like, which are used by the employees of the amusement ride 14, are connected to the communication system 58.

Both the control unit 52 and also the testing unit 56 each comprise an identification which can be transmitted via the communication system 58 to the control unit 60, so that the control unit 52 and the testing unit 56 can be unequivocally identified and associated with the rider holder 10 monitored by them.

Figure 7A:
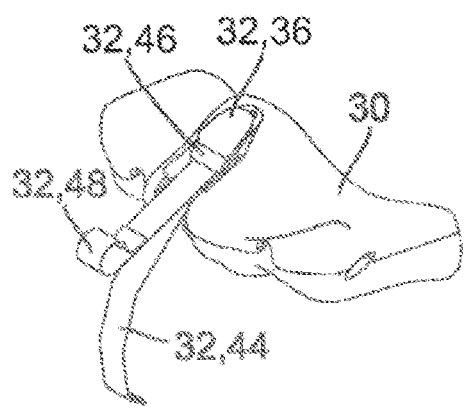
FIG. 7a shows a proposed securing device in the locked state.

The amusement ride 14 is described as follows: First, the restraining device 24 is moved by means of the adjustment device 26 into the open position, so that a rider has access to the holding portion 16 of the rider holder 10. After the rider has sat down in the holding portion 16, the restraining device 24 is moved by the adjustment unit 26 into the closed position. The adjustment between the open position and the closed position can alternatively also be performed by an employee of the amusement ride 14 or by the rider himself/herself. Subsequently, the restraining device 24 is fixed by means of the locking unit 28 in the closed position. The employee of the amusement ride 14 checks that the securing clip 25 is applied close to the body and pulls on the securing clip 25 in order to identify incorrect positions and incorrect functions on the securing clip 25. Unless this has already been done, the employee or the rider pulls the belt 44 to its full length. Now the employee or the rider inserts the belt 44 with the belt latch 42 into the securing device 32, as represented in FIG. 7*a*. The employee or the rider can tighten and retighten the belt 44 by gripping the handle section 48.

The safety switch 40 checks whether the holding element 34 engages in a positive-locking manner in the belt latch 42. In addition, the safety switch 40 controls whether the belt latch 42 is the correct belt latch 42. At the same time, the safety switch 40 performs a self check in order to determine whether it is working correctly. When all the conditions have been met, the safety switch 40 generates a state signal, according to which the securing device 32 is in the locked state, and the safety switch 40 is operating correctly. The communication system 58 transmits the state signal to the control unit 60 and/or the mobile terminals 62.

At the same time, the testing unit 56 checks to determine whether the locking unit 28 is working correctly. As already mentioned, the locking unit 28 can be operated hydraulically, so that the testing unit 56 can check, for example using a so-called A/B test, whether the hydraulic system has leaks and whether there is a volume loss. For the case in which the locking unit 28 is working correctly, the testing unit 56 generates a corresponding functional capability signal. The functional capability signal is transmitted via the communication system 58 to the control unit 60 and/or to the mobile terminal 62.

In case the locking unit 28 is not working correctly, the A/B test leads in many cases to a deviation of the movements of the restraining device 24 and in particular of the securing clip 25, which can be felt or seen by the employees and/or the riders. For example, the securing clip 25 moves more slowly or more rapidly than the adjacent securing clips, comes to a stop at another site and/or does not remain in the closed position, when an employee of the amusement ride pushes the securing clip in a position close to the body into the closed position. Consequently, the employees and/or the riders can detect without a functional capability signal generated by the testing unit 56 whether the locking unit 28 is working correctly or not. However, in addition, other irregularities on the rider holder 10 can also be detected, for example, a damaged thigh pad 30.

If the state signal indicates that the securing device 32 is in the locked state, the control unit 52 or the safety switch 40 is working error-free, and the functional capability signal and/or the employees of the amusement ride 14 confirm(s) the functional capability of the locking unit 28, the control unit 60 generates a release signal, so that the ride of the vehicle 12 in question can start.

Figure 7B:
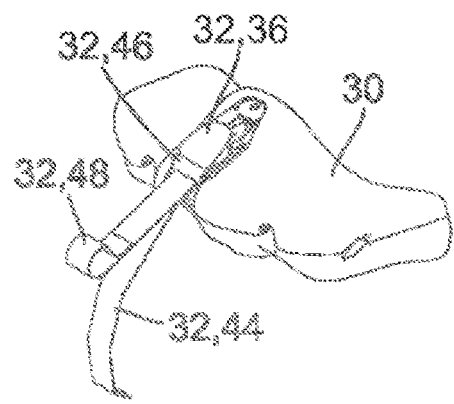
FIG. 7b shows the securing device represented in FIG. 7a in the unlocked state, in each case in a perspective view.

As soon as the ride has ended, the safety switch 40 moves the holding element 34 into the second end position, whereby the belt latch 42 is released. A counter element 36, in this case the belt latch 42, works in a self-opening manner together with the holding element 34. The result of this is that the belt latch 42 is shifted out of the securing device 32 as soon as the holding element 34 has been removed from the opening 45 of the belt latch 42. The securing device 32 is then in a position which is shown in FIG. 7*b*. Subsequently, the restraining device 24 is moved into the open position, so that the rider can exit the rider holder 10.

For the case in which the safety switch 40 detects that the securing device 32 is not in the locked state and/or the safety switch 40 detects a disturbance of its functional capability, the safety switch 40 generates a state signal which points out this situation. This state signal is transmitted to the control unit 60 and to the mobile terminals 62, so that the employees of the amusement ride 14 can initiate corresponding countermeasures. Because the safety switch 40 has an unequivocal identification, information is available to the employees, indicating on which rider holder 10 the safety switch 40 in question is located. The employees can go directly to the rider holder 10 in question.

For the case in which the testing unit 56 detects that the locking unit 28 is no longer working correctly, the testing unit 56 outputs a corresponding functional capability signal which is transmitted by means of the communication system 58 to the control unit 60 and the mobile terminal 62.

As mentioned, the amusement ride 14 can also be operated without the testing unit 56. If the A/B test reveals a deviation of the rider holder 10 and in particular of the locking unit 28 from the target state, which can be seen or felt by the employees, the employee who detects the deviations can notify the employee sitting in the building 61, for example, by radio. Mobile terminals 62 in the form of smartphones or tablets which communicate with the communication system 58 are not necessary.

As soon as the rider has exited the rider holder 10 in question, the restraining device 24 of this rider holder 10 is moved by an employee into the closed position and fixed by means of the securing device 32 in the closed position. For the case in which a testing unit 56 is present, the control unit 60 can be configured so that the restraining device 24 can no longer be moved out of the closed position until the closure of the operation. For the case in which no testing unit 56 is present, the employee sitting in the building 61 can issue a command to the control unit 60, according to which the restraining device 24 should no longer be moved out of the closed position until the closure of the operation.

Consequently, the rider holder 10 which comprises the locking unit 28 that is no longer capable of operating remains inaccessible to the riders until the closure of the operation of the amusement ride 14. After closure of the operation, the defective locking unit 28 can be replaced.

LIST OF REFERENCE NUMERALS

10 Rider holder
12 Vehicle
14 Amusement ride
16 Holding portion
18 Seat surface
20 Back rest 22 Armrest
24 Restraining device
25 Securing clip
26 Adjustment device
28 Locking unit
30 Thigh pad
32 Securing device
34 Holding element
36 Counter element
38 Protrusion
40 Safety switch
42 Belt latch
44 Belt
45 Opening
46 Belt length adjustment device
48 Belt loop
50 Load relieving element
52 Control unit
54 Tampering detection means
54 Identification means
55 Detection means
56 Testing unit
58 Communication system
60 Control unit
61 Building
62 Mobile terminal
63 Display

The invention claimed is:

1. A method for operating a vehicle for an amusement ride (14), wherein the vehicle comprises:
at least one rider holder comprising
a holding portion (16) for holding a rider,
a restraining device (24) which can be moved between an open position, in which the rider can access the holding portion (16), and a closed position, in which the held rider in the holding portion (16) can interact with the restraining device (24),
a lockable securing device (32) which, in a locked state, fixes the restraining device (24) in the closed position and, in an unlocked state, releases the restraining device (24), and
a control unit (52) which has a detection means (55), by means of which it can be redundantly determined in a fail-safe manner whether the securing device (32) is in the locked or unlocked state, the control unit (52) generating corresponding state signals,
wherein the rider holder comprises a locking unit (28) by means of which the restraining device (24) can be locked at least in the closed position; and
the vehicle further comprising;
at least two of the rider holders (10), and
a communication system (58) communicating with the control unit (52), by means of which communication system the state signals can be unequivocally associated with the control unit (52) of the rider holder (10) in question;
the method further comprising:
moving the restraining device (24) into the closed position,
fixing the restraining device (24) in the closed position by means of the securing device (32) which has been moved into the locked state,
redundant and fail-safe detection of whether the securing device (32) is in the locked state by means of the detection means (55) and generating of a corresponding state signal by means of the control unit (52);
checking the functional capability of the locking unit (28) and generating of corresponding functional capability signals by means of the testing unit (56);
associating the functional capability signals of the rider holder (10) in question by means of the communication system (58),
for the case in which the functional capability of the locking unit (28) of the rider holder (10) in question is not present, blocking the rider holder (10) in question by fixing the restraining device (24) in the closed position.

2. The method according to claim 1,
wherein the control unit (52) comprises tampering detection means (53), by means of which it is possible to detect in a tamper-proof manner whether the securing device (32) is in the locked or unlocked state.

3. The method according to claim 2,
wherein the securing device (32) comprises a holding element (34) fastened on the rider holder or on the restraining device (24), and a counter element (36) which can be moved relative to the holding element (34), wherein the counter element (36) in the locked state of the securing device (32) is fixedly held by the holding element (34), and the tampering detection means (53) comprise at least identification means (54) arranged on the counter element (36), which identification means can be read by the control unit (52).

4. The method according to claim 3,
wherein the securing device (32) comprises an actuatable safety switch (40) which interacts with the holding element (34) for fixing and releasing the restraining device (24).

5. The method according to claim 3,
wherein the holding element (34) is formed by the safety switch (40).

6. The method according to claim 3,
wherein the counter element (36) interacts with the holding element (34) in a self-opening manner.

7. The method according to claim 3,
wherein the counter element (36) is formed as a belt latch (42) which is fastened on a belt (44) connected to the restraining device (24) or the rider holder.

8. The method according to claim 7,
wherein the belt (44) comprises a belt length adjustment device (46).

9. The method according to claim 7,
wherein the belt (44), on its free end, forms a handle section.

10. The method according to claim 7, wherein the belt (44) is connected at its fixed end to a load relieving element (50).

11. The method according to claim 7,
wherein the belt (44), on its free end, forms a belt loop.

12. The method according to claim 1,
wherein the control unit (52) is configured in such a manner that it can be detected on the PLe level or the SIL3 level whether the securing device (32) is in the locked state.

13. The method according to claim 1,
wherein the control unit (52) and the stationary components of the securing device (32) are combined to form a physical unit.

14. The method according to claim 1,
wherein the rider holder comprises a testing unit (56), by means of which the functional capability of the locking unit (28) can be detected, wherein the testing unit (56) generates corresponding functional capability signals.

15. The vehicle according to claim 1,
wherein the communication system (58) communicates in such a manner with the testing unit (56) that the functional capability signals of the testing unit (56) can be associated with the rider holder (10) in question.

16. The method according to claim 1, comprising the following steps:
tamper-proof detection of whether the securing device (32) is in the locked state by means of the tampering detection means (53) and generating of a corresponding signal by means of the control unit (52).

17. The method according to claim 1, comprising the following steps:
fixing the restraining device (24) in the closed position by locking the securing device (32).

18. The method according to claim 1, further comprising the following steps:
unlocking the securing device (32),
stepwise moving the restraining device (24) from the closed position, to the point that the counter element (36) no longer comes in contact with the holding element (34), and
when the counter element (36) is no longer in contact with the holding element (34), moving the restraining element (24) into the open position.

19. An amusement ride (14) with a vehicle (12) according to claim 1, wherein the vehicle (12) can be operated with a method comprising the following steps:
moving the restraining device (24) into the closed position,
fixing the restraining device (24) in the closed position by means of the securing device (32) which has been moved into the locked state, and
redundant and fail-safe detection of whether the securing device (32) is in the locked state by means of the detection means (55) and generating of a corresponding state signal by means of the control unit (52).

20. The method according to claim 1,
wherein the safety switch (40) is configured in such a manner that it can be detected on the PLe level or the SIL3 level whether the securing device (32) is in the locked state.

21. The method according to claim 1, further comprising the following steps:
unlocking the safety switch (40),
stepwise moving the restraining device (24) from the closed position, to the point that the counter element (36) no longer comes in contact with the holding element (34), and
when the counter element (36) is no longer in contact with the holding element (34), moving the restraining element (24) into the open position.

22. The method according to claim 1, further comprising the following steps:
unlocking the securing device (32),
stepwise moving the restraining device (24) from the closed position, to the point that the counter element (36) no longer comes in contact with the holding element (34), and
when the counter element (36) is no longer in contact with the holding element (34), moving the restraining element (24) into the open position.

23. The method according to claim 1, further comprising the following steps:
unlocking the securing device (32),
stepwise moving the securing clip (25) from the closed position, to the point that the counter element (36) no longer comes in contact with the holding element (34), and
when the counter element (36) is no longer in contact with the holding element (34), moving the securing clip (25) into the open position.

* * * * *